LOGICAL CIRCUITS

Filed July 13, 1965 11 Sheets-Sheet 1

Dec. 13, 1966 HAJIME ENOMOTO ETAL 3,292,002

LOGICAL CIRCUITS

Filed July 13, 1965 11 Sheets-Sheet 2

Dec. 13, 1966 HAJIME ENOMOTO ETAL 3,292,002

LOGICAL CIRCUITS

Filed July 13, 1965 11 Sheets-Sheet 3

LOGICAL CIRCUITS

Filed July 13, 1965

Dec. 13, 1966 HAJIME ENOMOTO ETAL 3,292,002

LOGICAL CIRCUITS

Filed July 13, 1965 11 Sheets-Sheet 8

Dec. 13, 1966 HAJIME ENOMOTO ETAL 3,292,002

LOGICAL CIRCUITS

Filed July 13, 1965 11 Sheets-Sheet 11

United States Patent Office 3,292,002

Patented Dec. 13, 1966

3,292,002

LOGICAL CIRCUITS

Hajime Enomoto, Ichikawa-shi, and Saburo Shirai, Nerima-ku, Tokyo-to, Japan, assignors to Kokusai Denshin Denwa Kabushiki Kaisha, Tokyo-to, Japan, a joint-stock company of Japan Filed July 13, 1965, Ser. No. 475,308

Claims priority, application Japan, Dec. 30, 1958, 33/38,355; Feb. 28, 1959, 34/5,996

15 Claims. (Cl. 307—88)

This invention relates to improvements of logical circuits.

This application is a continuation-in-part of our application, Serial No. 859,612, filed Dec. 15, 1959, now abandoned.

Logical operations of logical circuits utilizing magnetic cores or magnetic elements are very stable, because the mechanical and electrical characteristics of magnetic cores do not vary for a long period of time and are very stable. Moreover, these logical circuits can be embodied as the devices of small size and low cost. Consequently, these logical circuits have been widely studied. The usual logical circuits utilizing magnetic cores can represent the binary digit 1 or 0 in accordance with existence or absence of a pulse. In these logical circuits, for attaining a logical operation with a constant output current, it is necessary that the magnetic cores have strictly rectangular hysteresis characteristics and the hysteresis characteristics of all the magnetic cores forming logical elements are equal as strictly as possible. However, if the cycle of excitation is increased to increase the speed of logical operation, unfavorable temperature rise of the magnetic cores occurs, whereby the rectangularity of the hysteresis characteristic of the magnetic core deteriorates and its operation becomes unstable. Furthermore, in the abovementioned logical circuits, logical elements are necessary for the operation "Not" among the operations "And," "Or" and "Not"; electrical connection must be remarkably varied with the variation of the kind of the logical operations; and number of branch lines at the output side is relatively small.

It is an object of this invention to provide a superior logical circuit having no such disadvantages as described above.

It is another object of this invention to provide a superior logical circuit capable of carrying out the logical operation in a sufficiently stable and speed manner even when magnetic cores having incomplete rectangular hysteresis characteristic are used.

Said object and other objects have been attained by the logical circuit of this invention, in which an even number of magnetic cores having substantially rectangular hysteresis characteristics and provided with several kinds of windings or couplings is combined with an even number of rectifying elements; a bridge is formed with said windings and elements; the impedance of one or more than one of the arms of said bridge is made to vary by an input signal having information; and an output signal having a polarity corresponding to the positive or negative polarity of the input signal is obtained. By the circuit of this invention, even though the rectangular characteristics of the various magnetic cores are made to vary somewhat by high-speed operation, it is possible to diminish this effect, because the circuit is in the form of a bridge.

The impedance of said bridge is always constant with respect to its electric source, because the impedance of one of each adjacent arms of said bridge is always higher or lower than that of another of said arms and the impedances of the opposite arms are always equal. Consequently, a constant current flows always into said bridge from the electric source. On the other hand, even when the characteristics of the magnetic cores and rectifying elements are varied somewhat with increased speed of the logical operation, relative variation between the impedances of the arms is very minor, whereby speed of the logical operation can be remarkably increased.

A positive or negative output current can be made to flow through the load circuit of a bridge, said load circuit being usually connected with two opposite terminals or ports of said bridge. Consequently, as will be described hereinafter, by reversely connecting said load terminals with the input terminals of the next stage, it is possible to carry out "Not" operation in a very simple manner. Furthermore, by use of said bridge system, it is possible to make the logical circuit operate in the same manner as usual cases even when a D.C. input current or a particular input current which represents 0 or +1, or 0 or −1 depending on whether said current ceases or flows is used (said particular current will be denoted as a single current hereinafter). Furthermore, an output current corresponding to the binary digit 0, +1 or 0, −1 can be taken out by cutting one arm of the bridge to form two terminals at said cut portion and by connecting a load between said terminals.

Furthermore, as will be described in detail hereinafter, it is possible by the application of this invention to increase practically and to an extreme degree the logical operational speed and, at the same, to reduce the number of the necessary circuits for accomplishing the same logical operation, because the logical operation by the circuit of this invention is made to take place in two stages, that is, the input stage and the output stage.

The novel features of this invention are set forth with particularity in the appendant claims, but this invention, both as to its function and operation together with objects and advantages thereof, may be understood by reference to the following description, taken in connection wth the accompanying drawings, in which the same or equivalent parts are designated by the same characters, numerals, symbols, and in which:

Figure 4:
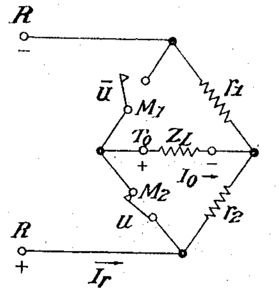
Figure 5:
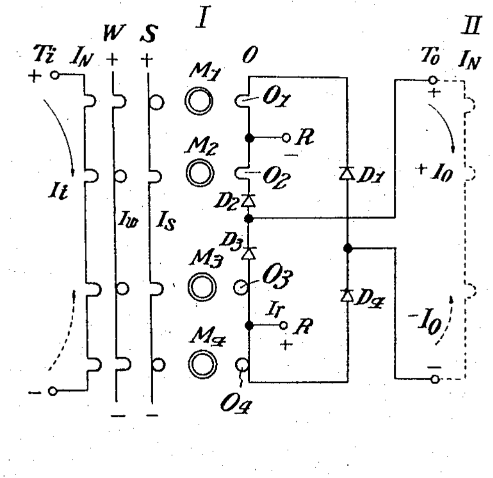
Figure 6:
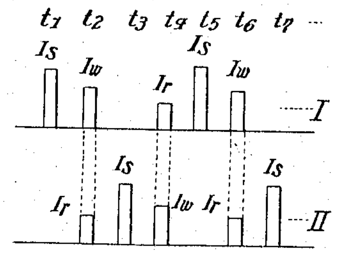
Figure 8:
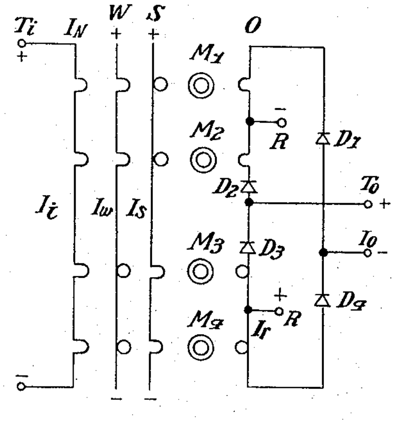
Figure 9:
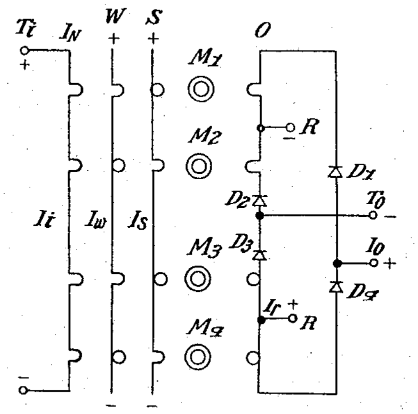
Figure 10:
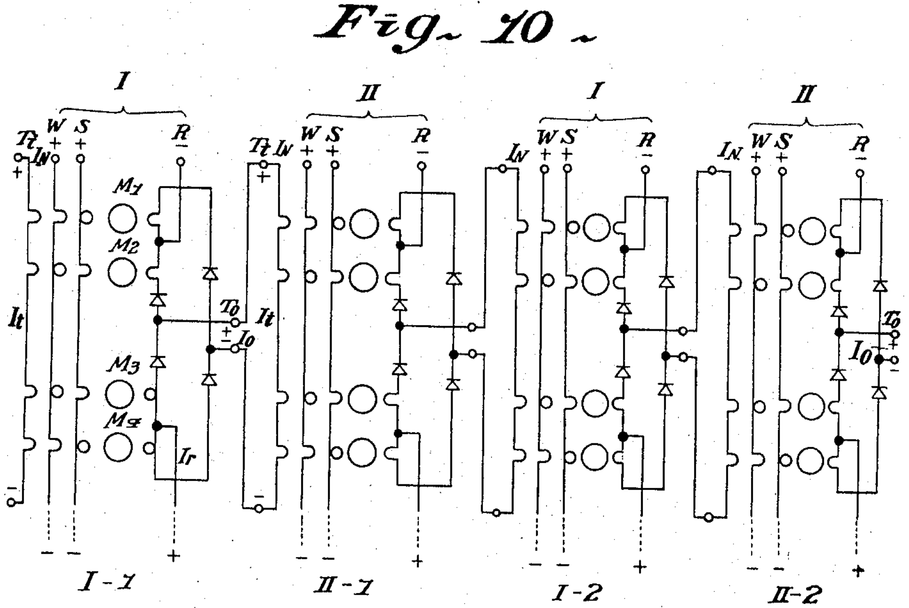
Figure 11:
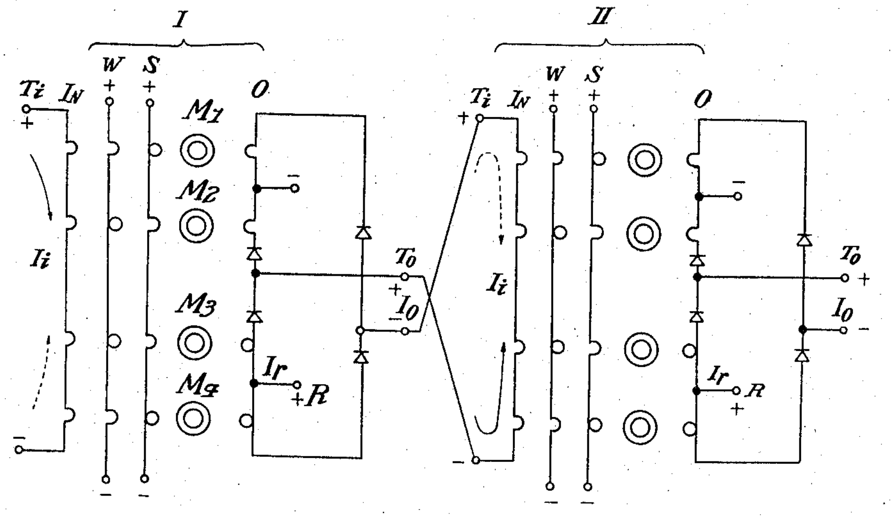
Figure 12:
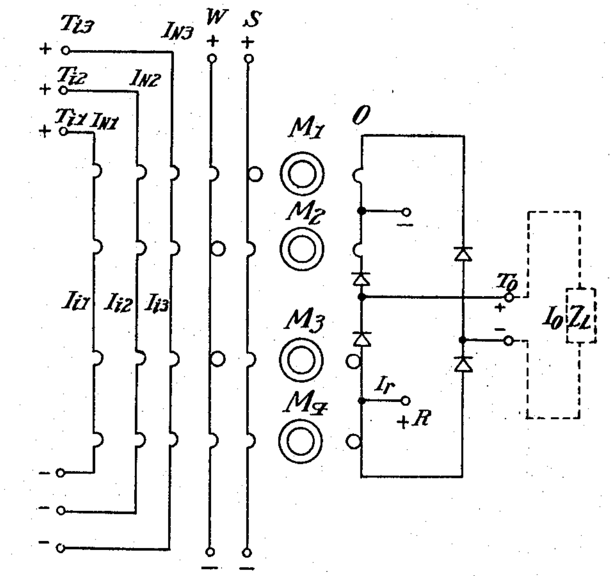
Figure 13:
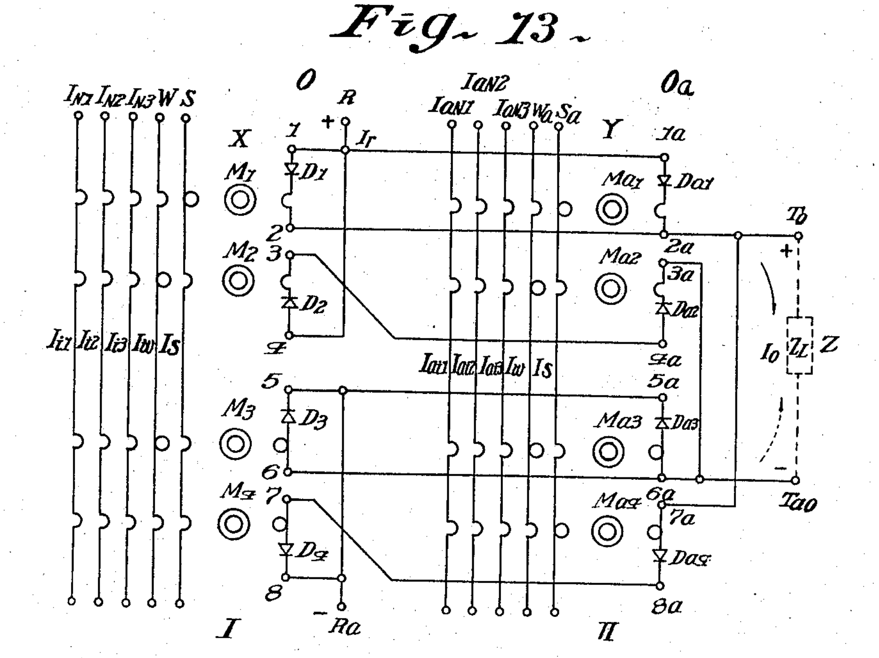
Figure 12:
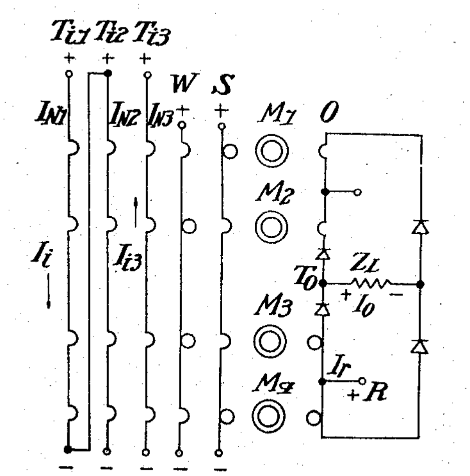
Figure 12:
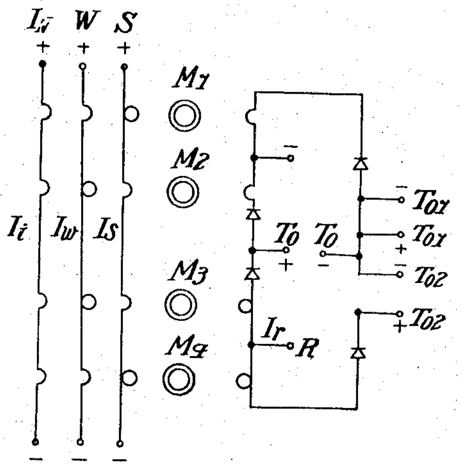
Figure 14:
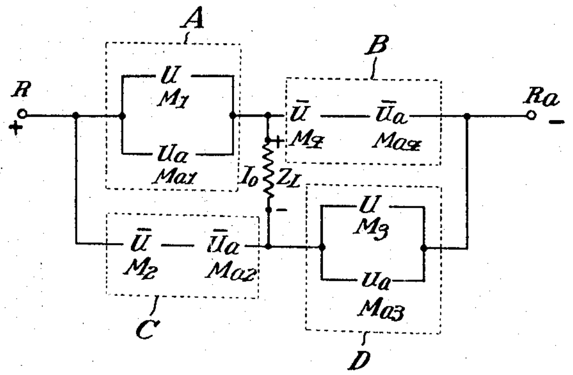
Figure 15:
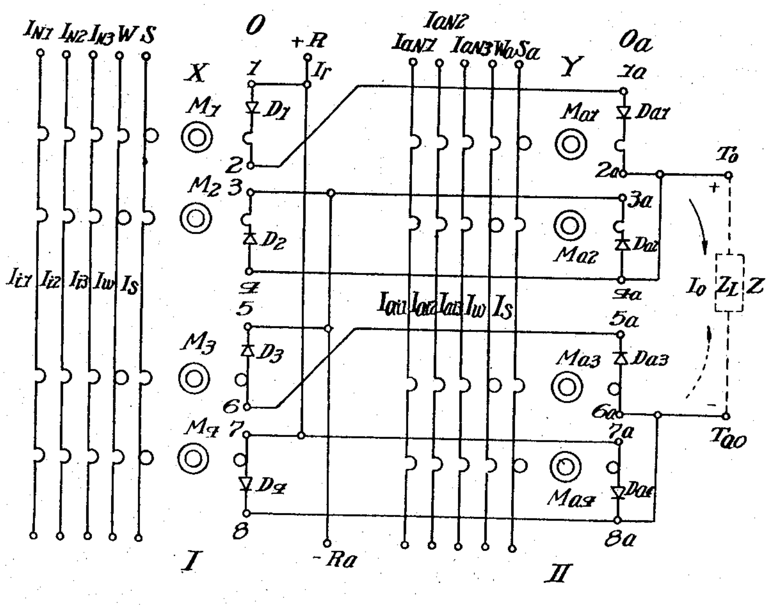
Figure 16:
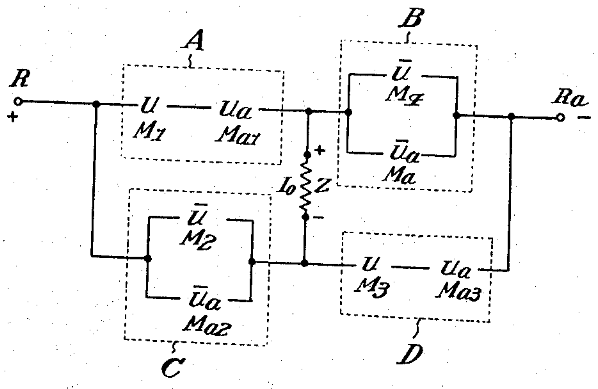
Figure 18:
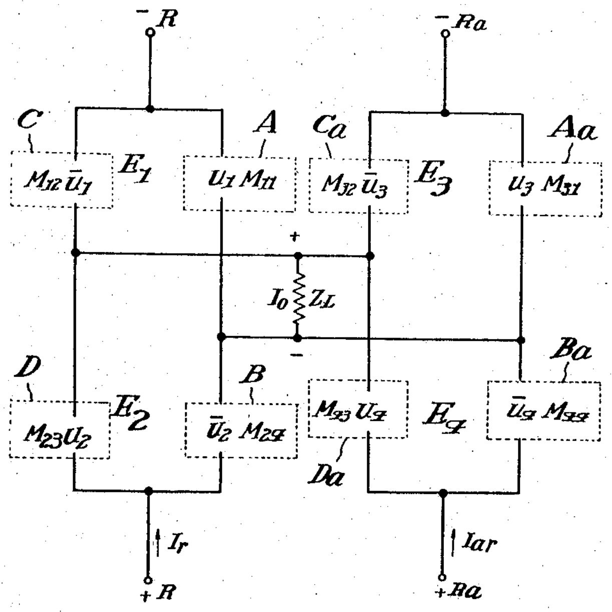
Figure 17:
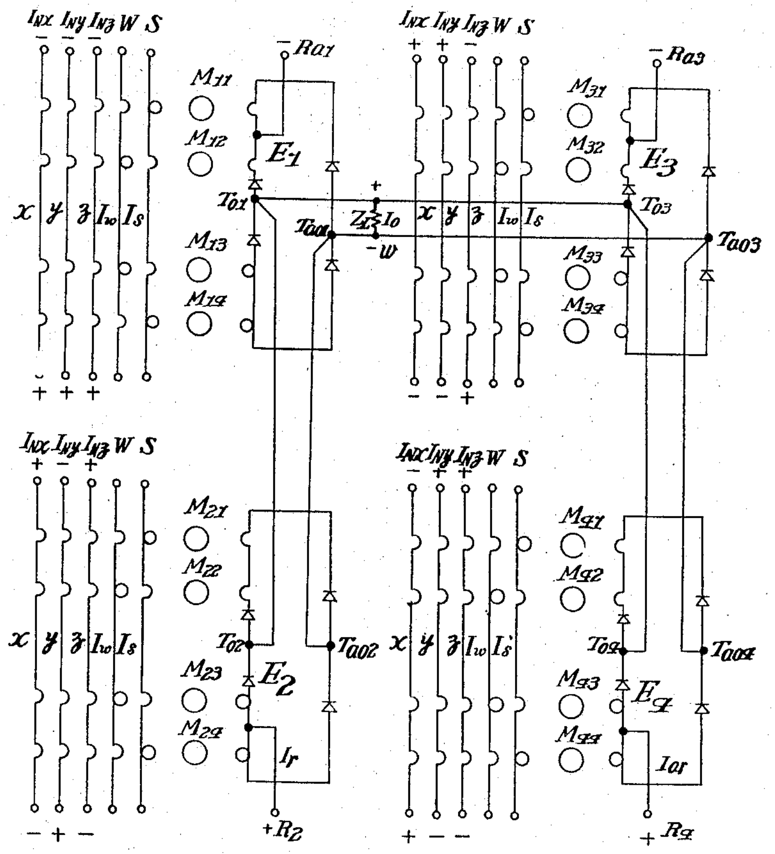
Figure 19:
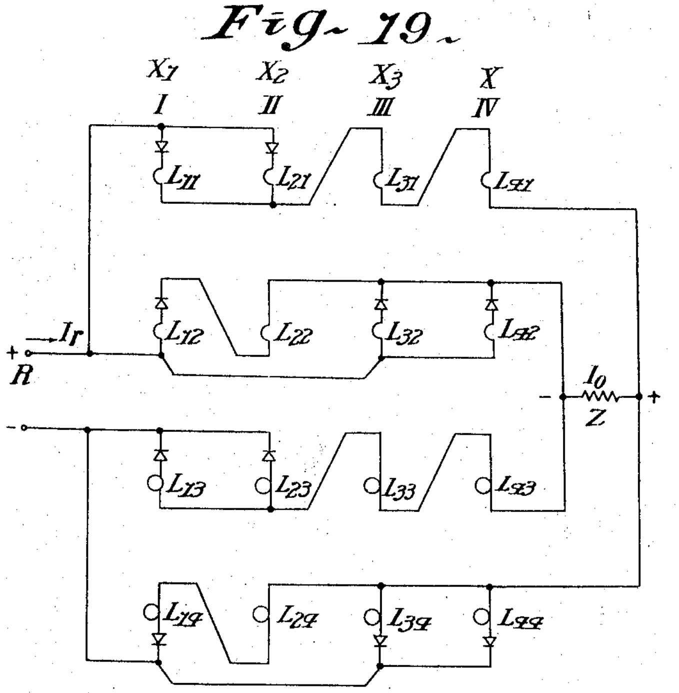
Figure 20:
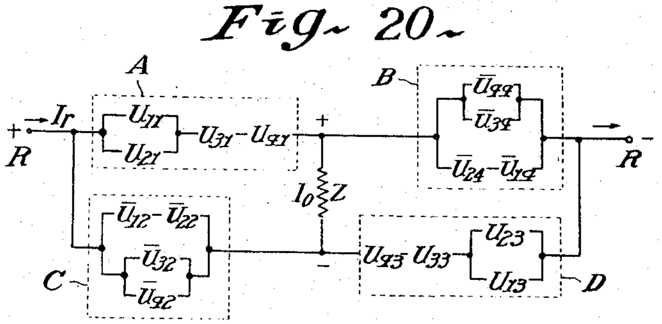
Figure 21:
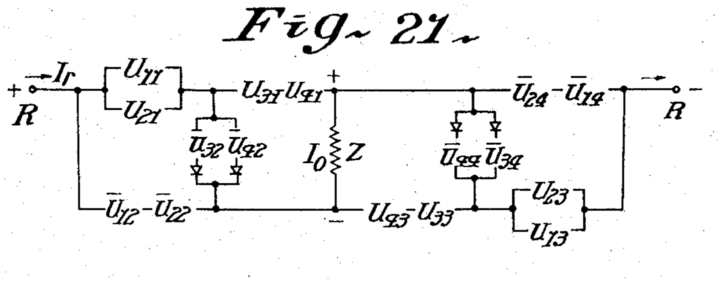
Figure 22:
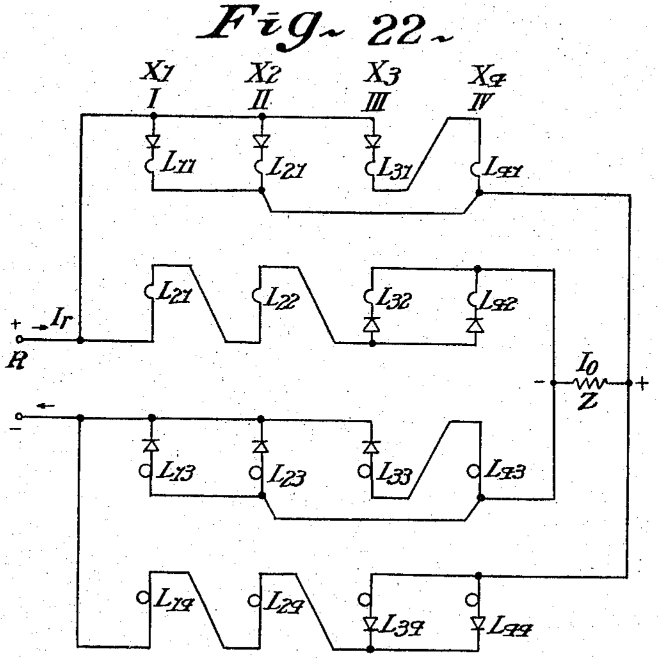
Figure 23:
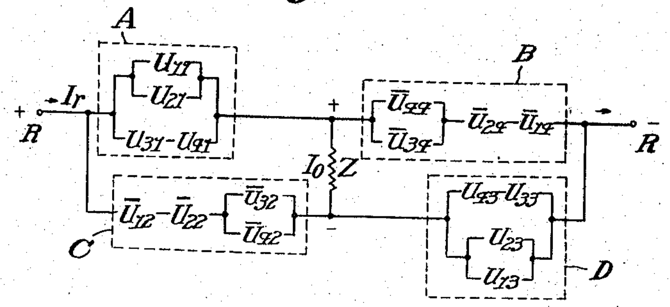
Figure 24:
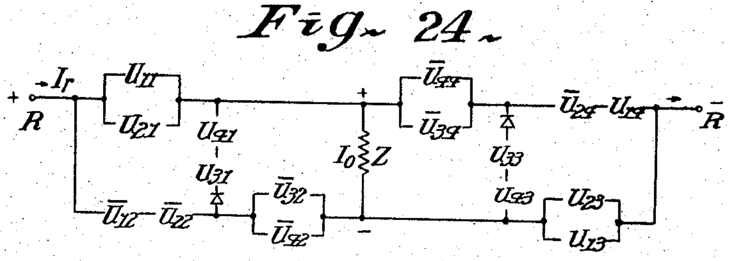

FIGS. 4(*a*), 4(*b*), 7(*a*), and 7(*b*) are respectively, diagrams in which contact points of mechanical relays have been submitted for the output circuits of FIGS. 1, 5, 8, and 9;

FIGS. 5, 8, and 9 are schematic connection diagram of other examples of this invention;

FIG. 6 is a graphical representation showing the driving pulse trains, involving resetting pulses, writing-in bias pulses and reading pulses which are used for the logical circuits of FIGS. 5, 8, and 9;

FIG. 10 is a schematic connection diagram of a shifting register constructed by using the logical circuit of this invention;

FIGS. 11 and 12(*a*) are schematic connection diagrams of other systems, showing actual applications of the logical circuits of this invention;

FIG. 12(*b*) is a schematic connection diagram of a modification of the embodiment of FIG. 12(*a*);

FIG. 12(*c*) is a schematic connection diagram of a modification of the embodiment of FIG. 5;

FIGS. 13, 15 and 17 are schematic connection diagrams of still other systems, showing actual applications of the logical circuits of this invention, principally the connections for effecting operations in the output circuit sides;

FIGS. 14, 16, and 18 are, respectively, diagrams in which contact points of mechanical relays have been substituted for the output circuits of FIGS. 13, 15, and 17;

FIG. 19 is a schematic connection diagram of a circuit for representing a complex logical function, said circuit being obtained by application of the logical circuit of this invention, and from said circuit being omitted the input, writing-in, bias, and resetting windings;

FIG. 20 is a diagram in which contact points of mechanical relays have been substituted for the output circuit of FIG. 19;

FIG. 21 is a modification of the relay circuit illustrated in FIG. 20;

FIG. 22 is a schematic connection diagram of another circuit for representing another complex logical function, said circuit corresponding to the circuit of FIG. 19;

FIG. 23 is a diagram in which contacts of mechanical relays have been substituted for the output circuit of FIG. 22;

FIG. 24 is a modification of the relay circuit illustrated in FIG. 23; and

Figure 25:
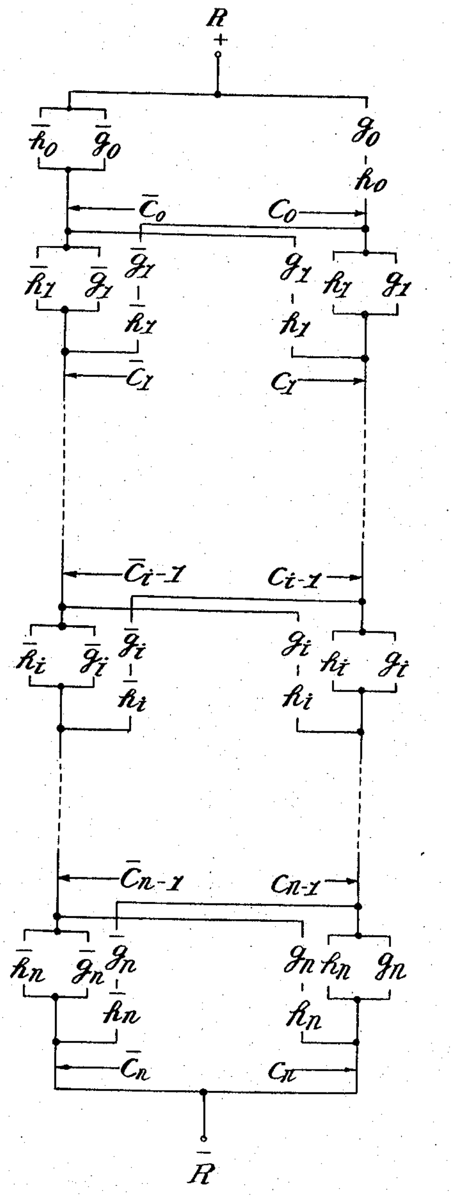

FIG. 25 is a schematic connection diagram illustrating the case wherein a high-speed "carry detector" is composed from the logical circuit of this invention.

Figure 1:
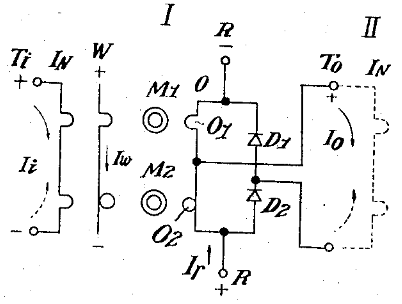
FIG. 1 is a schematic connection diagram of one example of this invention.
Figure 2:
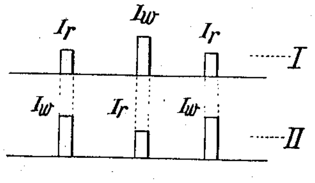
FIG. 2 is a diagrammatical representation of the driving pulse trains, involving reading pulses and writing-in bias pulses which are used for the logical circuit of FIG. 1.
Figure 3:
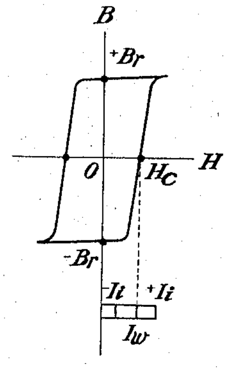
FIG. 3 is a graphical representation showing a hysteresis lop of the magnetic core to be used for the logical circuits of this invention, and the relation between input signal currents and writing-in bias current.
Figure 4:
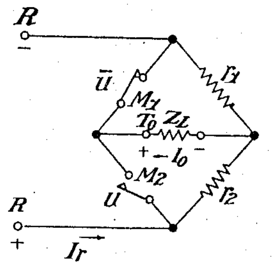

Referring to the drawings, FIG. 1 is a connection diagram showing one example of application of the basic circuit of the logical circuit of this invention. FIG. 2 shows the driving pulse train necessary for the operation with the aforesaid circuit. In FIG. 1, ferro-magnetic cores $M_1$ and $M_2$ have substantially rectangular hysteresis characteristics such as that of FIG. 3, which are substantially equal. A signal input winding $I_n$ is wound so that the winding directions for both magnetic cores will be the same, and a signal pulse current $I_i$ is made to flow from its input terminals $T_i$.

A writing-in bias winding W is wound in the same direction as the winding $I_n$ with respect to the core $M_1$ and in the opposite direction to the winding $I_n$ with respect to the core $M_2$. A signal output winding O has the dual function as a winding for resetting. To this winding are connected rectifying elements or rectifiers $D_1$ and $D_2$ such as for instance diodes, which have been connected in series so as to make the direction of conduction of current the same, to form a closed circuit. Terminals R for impressing driving pulse for resetting are provided at the connection points of the output winding O and the rectifying elements, and, furthermore, output terminals $T_o$ for leading out output signal pulses $I_o$ are provided at the intermediate portion of the output winding O and at the connection point between the rectifying elements.

Now, if a pulse current $I_r$, which functions dually for resetting drive pulse, is made to flow, as indicated in FIG. 1, from the +R terminal in the − direction, the residual magnetic flux of $M_1$ and $M_2$ will become, respectively, the points of $-Br$ and $+Br$ (FIG. 3), and the reset condition will be established. (For simplicity, the conditions of $+Br$ and $-Br$ shall be represented, respectively, by (+) and (−) hereinafter.) However, when resetting is done in this manner, rectifying elements $D_1$ and $D_2$, which are in the regular direction with respect to the reading-out current, to the output winding O, as may be seen from the illustration. Moreover, the input winding $I_n$ of the next stage (shown by dotted lines in the illustration) is connected to the output terminals $T_o$. The values of the impedance of the output winding O, the resistance of the rectifying elements $D_1$ and $D_2$ in the regular direction, and the impedance of the input winding of the next stage are selected suitably by employing a suitable number of turns in said windings in order to pass a sufficiently high pulse current through said output winding O to reset the cores $M_1$ and $M_2$.

After the cores $M_1$ and $M_2$ are placed in the (−) and (+) conditions in this manner, the input signal pulse current $I_i$ is made to flow in the input winding $I_n$; and, simultaneously, a writing-in bias pulse current $I_w$ of a magnitude adapted to produce a peaked magnetic field in each core, said field being substantially equal to the coercive force $H_c$ (FIG. 3) of the core, is made to flow in the writing-in bias winding W from the + to the − direction. Although, in the above case, a magnetic field which is approximately equal to $H_c$ is imparted by said writing-in bias pulse current, in the + direction with respect to the core $M_1$ and in the − direction with respect to the core $M_2$, when, at the same time, the input signal pulse current $I_i$, of positive polarity as indicated by solid line in FIG. 1, is added to the winding $I_n$, the magnetic fields induced in the core $M_1$ by both the pulse currents $I_i$ and $I_w$ are superimposed additively, because the windings $I_n$ and W are wound in the same direction, whereby a magnetic field of + direction which is larger than $H_c$ is imposed upon the core $M_1$, and the residual polarization of the core $M_1$ changes from (−) to (+). On the other hand, because the directions of the windings $I_n$ and W are opposite with respect to the core $M_2$, the magnetic fields induced in the core $M_2$ by the two above-mentioned pulse currents are superimposed differentially, whereby the magnetic field imposed upon the core $M_2$ and having − direction becomes smaller than $H_c$, and the residual polarization of the core $W_2$ is maintained unchanged in the (+) condition. Under these conditions, the current which is made to flow through the output circuit by the induced voltage accompanying the change in magnetic flux at this time is completely suppressed by the reverse-direction resistance of the rectifying element $D_1$. Consequently the writing-in is effected with very high efficiency. Furthermore, in the case where the input signal pulse current $I_i$ is of negative polarity as indicated by dotted line in FIG. 1, the magnetic field due to the current $I_i$ and that due to the current $I_w$ have directions which are opposite to that of the aforedescribed case, the polarity of the residual polarization of the core $M_1$ is retained unchanged in the (−) condition, and the polarity of the residual polarization of the core $M_2$ changes from (+) to (−). In this case, also, the current which is made to flow through the output circuit by the induced voltage accompanying the change in magnetic flux is completely suppressed by the reverse-direction resistance of the rectifying element $D_2$, and, consequently, the writing-in is effected with high efficiency. As a result, during the writing-in operation, if the input signal pulse current $I_i$, as to the information signal, is of positive polarity, the polarities of the residual polarizations of the cores $M_1$ and $M_2$ assume the conditions of (+) and (+), respectively, and if $I_i$ is of negative polarity, they assume the conditions of (−) and (−), respectively.

Next, in order to take out the signal which has been written in, with the condition of the polarity of the residual polarization, in the cores in the above-described manner, a reading-out pulse current $I_r$, which functions dually as a reset pulse, is made to flow in one direction from the terminal R of + polarity. Then, if the writing-in is effected by a positive signal pulse current $I_i$, and the cores $M_1$ and $M_2$ are in the (+) and (+) conditions, the coil $O_2$ of the winding O wound on the core $M_2$ will offer a low impedance with respect to the reading-out pulse current $I_r$, but the coil $O_1$ of the winding O wound on the core $M_1$ will offer a high impedance. Consequently, a large part of the current $I_r$ will flow through the path of coil $O_2$, input winding of the next stage (indicated by dotted line), $D_1$, and an information signal of positive polarity will be read out directly in the input signal winding of the next stage. At the same time, a certain amount of output current will flow through the coil $O_1$ also, causing the magnetic field of the core $M_1$ to change from (+) to (−), and the residual polarizations of the cores $M_1$ and $M_2$ will return to the reset condition of (−) and (+), respectively. On the other hand, if writing-in is effected by a negative signal pulse current $I_i$, and the cores $M_1$ and $M_2$ are in the (—) and (—) conditions, the coil $O_2$ wound on the core $M_2$ will offer a high impedance, and the coil $O_1$ wound on the core $M_1$ will offer a low impedance. Consequently, a large part of the reading-out pulse current $I_r$ will flow through the path of: $D_2$, input signal winding of the next stage and coil $O_1$, and an information signal of negative polarity will be read out in the input signal winding of the next stage. At the same time, a certain amount of the output current will flow through the coil $O_2$ also causing the core $M_2$ to change from (—) to (+), and the aforementioned polarizations will return to the reset condition.

While the process of the logical operation of the circuit shown in FIG. 1 has been described above, it is apparent that each of the magnetic cores performs the action which is extremely similar to that of a mechanical relay. That is, the input signal winding $I_n$ of the next stage corresponds to the signal winding or the exciting winding of a mechanical relay, and the output winding O corresponds to the contact points of the relay. In the case of FIG. 1, the output coil of the core $M_1$ corresponds to the "break" contact point of the relay, and the output coil of the core $M_2$ to the "make" contact point of the relay.

FIG. 4(*a*) shows a circuit wherein the output circuit of the circuit of FIG. 1 has been replaced by relay contact points, for the case wherein a signal input current of positive polarity is being made to flow. FIG. 4(*b*) illustrates the case wherein a signal input current of negative polarity is being made to flow. Contact point *u* has the function of closing or opening depending on whether the input current is positive or negative; and $\bar{u}$ has the function of opening or closing depending on whether the input current is positive or negative. $R_1$ and $R_2$ are, respectively regular direction resistances of the rectifying elements of FIG. 1, and $Z_L$ is a load impedance which is equivalent to the input impedance of the next stage in the case of FIG. 1.

FIG. 5 illustrates one example of another basic logical circuit of the present invention, in which four sequential magnetic cores $M_1$, $M_2$, $M_3$, and $M_4$ made of preferably ferro-magnetic material and four rectifiers or rectifying elements $D_1$, $D_2$, $D_3$, and $D_4$ are used. By the use of this circuit, it is not necessary to consider the relation between the impedance of the output winding and the impedance of the rectifying elements and input winding of the next stage as in the case of the circuit of FIG. 1.

Consequently, any number of winding turns and any impedance can be selected, whereby the logical operation is made very easy. That is, an input winding $I_n$, a writing-in bias winding W, a reset winding S, and an output winding O are so provided, and terminals R, which impart reading-out pulse current, are so installed between the coils $O_1$ and $O_2$ of the winding O wound, respectively, on the cores $M_1$ and $M_2$ and between the coils $O_3$ and $O_4$ of the winding O wound, respectively, on the cores $M_3$ and $M_4$ that the cores $M_1$ and $M_3$ are caused to perform the same actions as the core $M_2$ of FIG. 1, and the cores $M_2$ and $M_4$ are caused to perform the same action as the core $M_1$ of FIG. 1. Furthermore, the rectifying elements $D_2$ and $D_3$ are connected in series and placed between said coils $O_2$ and $O_3$ in the direction of flow of the reading-out pulse current, and the rectifying elements $D_1$ and $D_4$ are connected in series and placed between the coils $O_1$ and $O_4$ in said direction of current flow. In addition, the connecting point of the rectifying elements $D_2$ to $D_3$ and that of the rectifying elements $D_1$ to $D_4$ are made the output terminals $T_o$ and are connected to the signal input winding $I_n$ of the next stage.

The driving pulse train of a basic logical circuit using four magnetic cores and four rectifying elements as described above is represented in FIG. 6. Its action is as follows: When a pulse current $I_s$ for resetting is made to flow with sufficient magnitude in the direction of from the + side to the — side of the resetting winding S, the residual polarizations of the cores $M_1$, $M_2$, $M_3$, and $M_4$ assume their respective reset conditions of (—), (+), (+), (—).

Next, if a writing-in bias pulse current $I_w$ is made to flow in the direction of from the + side to the — side of the winding W, and an input signal pulse current $I_i$ is made to flow simultaneously through the input signal winding $I_n$, writing-in will be effected with the cores $M_1$, $M_2$, $M_3$, and $M_4$ in the conditions of (+), (+), (+), and (+), respectively, in the case when the current $I_i$ is positive and in the reverse conditions of (—), (—), (—), and (—), respectively, in the case when the current $I_i$ is negative, as described for the circuit of FIG. 1. In order to read out information written in this manner, a pulse current $I_r$ for reading-out is made to flow through the terminals R from + to —. Then, if the aforesaid magnetic cores have been written in in the conditions of (+), (+), (+), and (+), the coils $O_2$ and $O_4$ of the winding O will offer a high impedance with respect to the current $I_r$, and the coils $O_1$ and $O_3$ of the winding O will offer a low impedance thereto. Consequently the current $I_r$ will flow principally through the following path: Coil $O_3 \rightarrow D_3 \rightarrow$ input winding of the next stage $\rightarrow D_1 \rightarrow$ coil $O_1$, and will send out a reading-out pulse current, as a direct, output pulse current $+I_o$ of positive polarity, into the input winding of the next stage. At the same time, a certain amount of the reading-out current will flow also in the high-impedance winding side, the cores $M_2$ and $M_4$ will change from the (+) to the (—) condition, and the aforesaid magnetic cores will assume conditions of (+), (—), (+), and (—), respectively.

Conversely, if the aforesaid magnetic cores have been written in the conditions of (—), (—), (—), and (—), respectively, the relative magnitudes of the impedances of the windings of the magnetic cores will be the reverse of those described above, and the current $I_r$ will flow principally through the path of: Coil $O_4$—$D_4$—Input winding of the next stage $\rightarrow D_2 \rightarrow$Coil $O_2$, and will send out an information, as an output pulse current $-I_c$ of negative polarity, to the input winding of the next stage, at the same time, causing the aforesaid magnetic cores to assume conditions of (+), (—), (+), and (—), respectively. After the information has been read out in this manner, the reset pulse current $I_s$ is made to flow again through the winding S to return the aforesaid magnetic cores to the conditions of (—), (+), (+), and (—), respectively. In this manner, the same operation is repeated to effect, successively, the actions of writing-in, reading out, and resetting.

In the above described case, if the internal impedance of the reading-out pulse source is made sufficiently high, the reaction current due to the voltage induced in the output winding during writing-in is completely suppressed by the reverse resistances of the rectifying elements. Therefore, the writing-in is effected with high efficiency. Furthermore, although voltages are induced in the coils $O_4$ and $O_2$ of the output winding O during resetting, their directions are opposite; therefore, they cancel one another, and, by making the internal impedance of the reading-out pulse source sufficiently high, the reaction current due to resetting is completely suppressed, whereby resetting can be carried out efficiently. Moreover, this case differs from that utilizing two magnetic cores and two rectifying elements as indicated in FIG. 1 in that the impedance of the output winding can be selected independently of the impedances of the rectifying elements and the input winding of the next stage, and in its advantage of having the possibility of obtaining an output which can be increased freely by increasing the number of turns of the output winding. Consequently, it is possible to design the circuit so as to obtain a relatively large number of the output windings. Moreover, because the rectifying elements function only to suppress the reaction current during writing-in and are installed in the regular direction with respect to the reading-out pulse current $I_r$, they impose no obstacles whatsoever. Furthermore, it is possible to completely suppress the reaction current which occurs during reading-out from the next stage and resetting, and to completely effectuate a directional transmission of any information signal.

Figure 7:
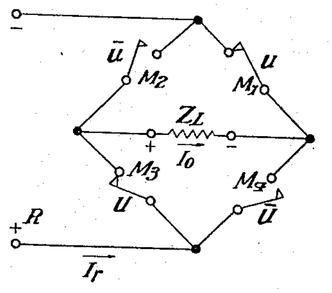
Figure 7:
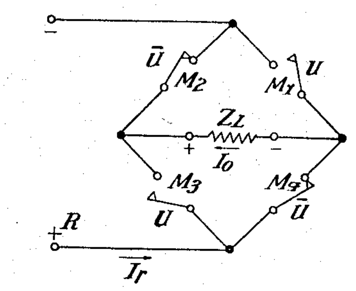

It is possible to consider the output circuit for the case in which four magnetic cores are used as being substituted by the contact points of mechanical relays in a manner similar to that indicated in FIGS. 4(*a*) and 4(*b*). FIG. 7(*a*) illustrates the case wherein a signal input current of positive polarity has been imposed, and FIG. 7(*b*) illustrates the case wherein a signal input current of negative polarity has been imposed. As described previously, contact points $u$ and $\overline{u}$ have the functions of closing or opening depending on the polarity of the input current. However, the rectifying elements have been omitted, because they have no connection with functioning.

While basic examples of the case wherein two magnetic cores are used and the case wherein four magnetic cores are used have been described above, the manner in which the windings W and S are wound may be modified as shown in FIGS. 8 and 9. In either case, exactly the same action will result even though the directions of the currents $I_W$ and $I_S$ are reversed. Moreover, it is apparent that, if the directions of the currents $I_W$ and $I_S$ are made mutually opposite, either of the windings W and S can be used for all such actual applications as will be described hereinafter, exactly the same actions may be obtained by the use of the other basic logical circuits mentioned above.

A detailed description of the functioning principles of various examples of the basic logical circuit of this invention has been presented above. The method of assembling this basic logical circuit and carrying out logical operations will now be described.

First, in the case of constructing a shifting register, the output terminals $T_o$ of the circuit of this invention, illustrated in FIGS. 1, 5, 8, and 9, are connected successively to the input terminals $T_i$ of the next stage in such a manner that the same polarities are connected with one another. These are divided into two groups I and II, and the currents $I_W$, and $I_r$, and $I_s$ are made to flow, in sequence, through the windings and terminals of each group, with the respective phases of said currents lagged by one half cycle as indicated in I and II of FIG. 2 for the element of FIG. 1 and in I and II of FIG. 6 for the element of FIGS. 5, 8, and 9, and, at the same time, with synchronization so that the reading-out pulse current $I_r$ of the preceding stage and the writing-in bias pulse current $I_W$ of the next stage will be impressed simultaneously, whereby the information can be shifted in order.

FIG. 10 illustrates the case wherein the circuit of this invention illustrated in FIG. 5 has been connected in cascade formation. In FIG. 10, reference symbols I and II designate groups corresponding to I and II of FIG. 5, and I–1, II–1, I–2, II–2, etc., designate the sequential numbers of the basic circuits belonging to the two groups.

Referring, first, to the driving pulse train of FIG. 6, if a resetting pulse current $I_s$ of positive polarity flows, at an instant of time $t_1$, through the winding S of the circuit belonging to the group I, the residual polarizations of the magnetic cores $M_1$, $M_2$, $M_3$, and $M_4$ become (−), (+), (+), and (−), respectively, as described previously. Then, if an input signal pulse current $I_i$ of positive or negative polarity, having information, is impressed at a time $t_2$ from the preceding stage on the input winding $I_n$ of the basic circuit I–1, a writing-in bias pulse current $I_W$ of positive polarity flows simultaneously therewith in the winding W. Consequently, as described previously, the aforesaid magnetic cores assume polarities of (+), (+), (+), and (+), respectively, or (−), (−), (−), and (−), respectively, in accordance with the polarity of the current $I_i$, and said information is written in the magnetic cores of the circuit I–1 in the polarity pattern of their residual polarizations.

At a later time $t_3$, the circuit belonging to the group II is reset by a resetting pulse current. At a subsequent time $t_4$, a reading-out pulse current $I_r$ flows through the terminals R of the circuit of the group I, placing the magnetic cores of the group I in the condition of (+), (−), (+), and (−), respectively. If the circuit I–1 is written in by a current $I_i$ of positive polarity, an output pulse current $I_o$ of positive polarity in accordance with the polarity of the current $I_i$ will be imposed with positive polarity from the output terminal $T_o$ of the circuit I–1 onto the input winding $I_n$ of the circuit II–1 of the group II. At this time, a writing-in bias pulse current I belonging to the group II will flow in the winding W of the circuit II–1, and the magnetic cores of the circuit II–1 will be written in the condition of (+), (+), (+), and (+).

At a time $t_5$, a resetting pulse current $I_s$ of the group I flows in the winding S of the circuit I–1, and the aforesaid magnetic cores are returned to the conditions of (−), (+), (+), and (−), respectively. At a subsequent time $t_6$, a reading-out pulse current flows through the terminals R of the circuit II–1; and output current of positive polarity is imposed from the output terminal thereof to the input winding of the circuit I–2 of the next stage and, simultaneously, causes the aforesaid magnetic cores to assume the condition of (+), (−), (+), and (−), respectively. The circuit I–2, which has received an input pulse current of positive polarity, thus transmits its output to the circuit II–2 by the same process as in the circuit I–1, and an output pulse current $I_o$ of positive polarity is obtained one half cycle later from the output terminals of the circuit II–2. Of course, the polarity of this current $I_o$ is the same positive polarity as that of the input signal pulse current of the circuit I–1. Further, it is similarly apparent that, if the polarity of the input signal pulse current of the circuit I–1 is negative, the polarity of the output pulse current of the circuit II–2 is negative. Consequently, it is possible to construct a shifting register in which an information signal is shifted successively from the group I to the group II and from the group II to the group I by the repetition of the operation wherein the information signal is shifted from the preceding stage to the next stage when unit logical circuits are connected in cascade formation as indicated in FIG. 10. Moreover, if the internal impedance of the reading-out pulse source is taken sufficiently high, the transmission of the information in the reverse direction can be completely suppressed by the reverse impedance of the rectifying elements.

It is also possible to classify the units into N classes in cyclic manner with respect to the cascade connection; that is if $N=3$, A, B, C; A, B, C, etc., then one would connect in parallel all the input ports of units of the same class, likewise the write-in ports of units of the same class would be in parallel. One would then make the phase of the input currents between adjacent classes $1/N$ cycles apart, that is if $N=3$ the phase difference between the input current to a unit belonging to an "A" class and the input current to a unit belonging to either a "B" or "C" class would be 120°. Likewise the write-in currents between adjacent units would have a phase difference of 120°.

The case for a shifting register has been described above, but if, as shown in FIG. 11, the output terminals $T_o$ and the input terminals $T_i$ of the next stage are connected in reverse, the memory content of the preceding stage will be reversed in polarity as it is shifted to the succeeding stage, and a "Not" logical operation will be very simply effected.

If, as indicated in FIG. 12(*a*), three input windings $I_{n1}$, $I_{n2}$, and $I_{n3}$, with input terminals $T_{i1}$, $T_{i2}$, and $T_{i3}$, respectively, are provided, and, during writing-in, a current of constant amplitude and positive polarity, for example, as $I_{i1}$, is made to flow through the winding $I_{n1}$ in the direction of from + to − of the terminal $T_{i1}$, it will be possible to write in the results of carrying out, on the input side by the principle of decision by majority, the logical operation of logical sum or "OR" of the logical variable currents $I_{i2}$ and $I_{i3}$, which have the same amplitude as the current $I_{i1}$, or the operation of logical product or "AND" if a current of negative polarity is made to flow as the current $I_{i1}$, and said results being written in as residual magnetic flux in the aforementioned magnetic cores.

Said results may be taken out, by means of the reading-out current, by connecting a load $Z_L$ to the output terminals, whereby an output pulse current of the logical sum, $I_o=I_{i2}+I_{i3}$, or an output pulse current of the logical product, $I_o=I_{i2}\cdot I_{i3}$, can be taken out in the form of polarity of pulse current of constant amplitude. While the case of three inputs has been described above, it is apparent that the same operation of decision by majority is possible also for any odd number of inputs greater than three. Moreover, in any logical operation, said operation during writing in is carried out only on the input side, and, during reading out, the information content impressed as memory in the magnetic cores is merely read out as it is. Therefore, since it is possible to carry out only one cycle of logical operation with one control cycle of writing in and reading out, if a logical operation is to be carried out again with the information content which has been written in as the result of a prior logical operation, said written information content must first be read out, and then another logical variable must be added in the succeeding writing-in stage, and the logical operation is carried out thereafter. The aforementioned explanation relates to basic logical circuits applied to the case wherein pulse output current having positive and negative polarities. In the following will be described the case, in which a single current representing the binary digit 0 and +1 or 0 and −1 is used as the input current.

Now, referring to FIG. 12(*a*) let it be assumed that to the input winding $I_{n1}$, $I_{n2}$, or $I_{n3}$ is impressed a signal input current $I_i$ of + polarity or not impressed. In this case, it is possible to obtain an output load current $I_0$ of − polarity or + polarity depending on whether the input current $I_i$ of + polarity is not applied or applied. Such operation can be carried out by connecting two of the three input windings $I_{n1}$, $I_{n2}$, and $I_{n3}$ in series, as illustrated in FIG. 12(*b*).

In the circuit of FIG. 12(*b*), let it be assumed that a pulse signal current $I_i$ corresponding to the binary digit 0 or +1 is impressed to said series windings $I_{n1}$ and $I_{n2}$ and another pulse signal current $I_{i3}$ having the same amplitude as the former current $I_i$ is impressed, as the pulse signal current of + polarity, to the winding $I_{n3}$ in the reverse direction. In this condition, if the current $I_i$ is zero, on the current $I_{i3}$ of − polarity becomes pulse input current, so that a pulse output current $I_o$ of − polarity flows through the load $Z_L$. On the contrary, if the pulse current $I_i$ of + polarity is impressed, a pulse output current $I_o$ of + polarity flows through the load $Z_L$, because the same result as the case in which only one kind of pulse current of + polarity is impressed to only one input winding is obtained by the decision by majority. When the pulse imput current $I_i$ representing 0 or −1 is adopted, the same pulse output current as the aforementioned output current $I_o$ will be obtained as long as the pulse current of positive polarity is used as the current $I_{i3}$. On the other hand, even when a direct current is used as the input current, the same output current as said current $I_o$ will be obtained as long as the magnitude of said direct current is so selected that the magnetic flux densities of the magnetic cores do not exceed the coercive force $H_c$ of said cores. The embodiment of FIG. 12(*b*) relates to the case wherein a pulse output current having positive or negative polarity is obtained by connecting a load $Z_L$ to the output terminals $T_o$, said load being usually an impedance of the input winding of the next stage. However, since, as described above in connection with the circuits of FIGS. 5, 7(*a*), and 7(*b*), a directional pulse current flows or scarcely flows through the arms of the bridge depending on whether the polarity of the pulse input current is + or −, when one arm of the bridge is cut off and to this cut portion are provided output terminals, a pulse output current representing the binary digit 0, +1 or 0, −1 will be obtained at said output terminals. The embodiment of FIG. 12(*c*) relates to the case in which the circuit of FIG. 5 is used and between the output terminal $-T_o$ and the rectifying element $D_4$ are, respectively, provided the single current output terminals $+T_{o1}$, $-T_{o1}$ and $+T_{o2}$, $-T_{o2}$. In this embodiment, the pulse output current obtained from the three output terminals $T_o$, $T_{o1}$ and $T_{o2}$ corresponds to +1 at the terminal $T_{o1}$ and to 0 at the terminal $T_o$ in the case of +1 at the terminal $T_o$ and corresponds to 0 at the terminal $T_{o1}$ and to +1 at the terminal $T_{o2}$ in the case of −1 at the terminal $T_o$. Consequently, when the adjacent arms of the bridge are, respectively, cut off at their respective intermediate portions, to these cut portions are provided output terminals, and pulse output currents corresponding to 0, +1 and +1, 0 are used as the pulse input currents, pulse output currents of positive and negative polarities can be obtained by positively connecting one of two input windings of the next stage to the terminal $T_{o1}$ and by reversely connecting another of said windings as the "Not" connection.

By the circuit of this invention, in addition to the operation on the input side as above described, logical operations may be carried out also on the output side. As previously described with reference to FIGS. 4(*a*), 4(*b*), 7(*a*), and 7(*b*), since the output coils wound on the various magnetic cores are extremely similar to the contact points of mechanical relays, it is possible to enable logical operation in each of the writing-in and reading-out steps by combining, in conformity with the object, only the respective output coils wound on the magnetic cores of a number of the circuit belonging to the group I or group II, said output coils being divided and separated in an assembly of unit elements including one rectifying element, with a similarly divided and separated unit element of another circuit belonging to the same group, whereby two cycles of logical operation can be effected by one control cycle comprising writing-in and reading out. As a result, it is possible to increase substantially the speed of operation. At the same time, the same logical operation is effected with a smaller number of unit circuits than the necessary number thereof for operation on only the input side. The principle and functioning relating to the above circuits will be more apparent by reference to the following detailed description and the accompanying drawings.

FIG. 13 is a connection diagram showing one example of a winding arrangement constructed so as to obtain an output pulse current of logical sum based on the information content of two unit logical circuits during the reading out of the information content which has been written in as the result of a logical operation in which operation of decision by majority is effected simultaneously in both unit logical circuits during writing-in, that is, on the input side. In FIG. 13, $M_1$, $M_2$, $M_3$, and $M_4$ and $M_{a1}$, $M_{a2}$, $M_{a3}$, and $M_{a4}$, are the various magnetic cores of the first circuit group I and the second circuit group II, respectively, and are provided with signal input windings, writing-in bias windings, reset windings, and output windings, respectively.

The signal input winding $I_{N1}$, $I_{N2}$, $I_{N3}$, and $I_{aN1}$, $I_{aN2}$, $I_{aN3}$; the writing in bias windings W and $W_a$, and the reset windings S and $S_a$ are connected similarly as in the circuit indicated in FIG. 12. However, only the output windings O and $O_a$ have a rectifying element for each respective magnetic core, each series of elements being connected in series connection and separating into unit elements. The terminals 1 through 8 and 1*a* through 8*a*, of the unit elements are connected as in the drawing as follows: 1 to 1*a* and to 4, 2 to 2*a* and to 7*a*, 3 to 4*a*, 3*a* to 6*a* and to 6, 5 to 5*a* and to 8, and 7 to 8*a*; the reading-out pulse source terminals R and R$a$ are connected, respectively, to $2a$ or $7a$ and to $3a$ or $6a$. In the ordinary case, the load $Z_L$ is substituted for the input winding of the next stage.

FIG. 14 illustrates an arrangement wherein the output circuits have been substituted by the functioning of the contact points of mechanical relays similarly as in the illustrations indicated previously, and wherein A, B, C, and D represent four arms if the bridge and U$a$ and $\overline{U}a$ have the same functioning capacities as U and $\overline{U}$, respectively, as described above. In the case when an information is to be written into the first and second unit logical circuits wherein the output windings have been divided and separated and reconnected anew, or in the case of resetting, these operations are carried out in exactly the same manner as described with reference to FIG. 5, and the reaction current due to the counter voltage induced on the output side is completely suppressed by the internal impedances of the reading-out pulse source and the reverse resistance of the rectifying elements, which suppression is the same as in the case illustrated in FIG. 5.

If, in the first circuit, that is, of the cores $M_1$, $M_2$, $M_3$, and $M_4$ side, the condition wherein an information signal has been written into said magnetic cores by three signal input currents $I_{i1}$, $I_{i2}$, $I_{i3}$, and a writing-in bias current $I_w$ is represented by X, and that of the second circuit, that is, of the cores $M_{a1}$, $M_{a2}$, $M_{a3}$, and $M_{a4}$, side is represented by Y, the designation of X and Y by + or − means that the magnetic fields of respective magnetic cores are all in the (+) or (−) condition. Accordingly, the reading-out mechanism for the cases wherein said X and Y are respectively, combined will be described below.

(1) When X and Y are both in the − condition. That is, if with the cores $M_1$, $M_2$, $M_3$, and $M_4$ and $M_{a1}$, $M_{a2}$, $M_{a3}$, and $M_{a4}$ written in the condition of (−), (−), (−), and (−), a reading-out pulse current $I_r$ is made to flow in the direction of from + to − of the reading-out terminals R, the respective output coils would on the cores $M_1$, $M_3$, and $M_{a1}$, $M_{a3}$, in which the direction of flow of the current $I_r$ becomes coincident with respect to the polarity of the residual flux density of the magnetic cores will offer lower impedance against the current $I_r$. Consequently, this reading-out pulse current $I_r$ flows principally in the direction of: Reading-out pulse source terminal $+R \rightarrow 4 \rightarrow 3 \rightarrow 4a \rightarrow 3a \rightarrow T_{ao} \rightarrow Z_L \rightarrow T_o \rightarrow 7a \rightarrow 8a \rightarrow 7 \rightarrow 8 \rightarrow -R_a$, and an output pulse current $I_o$ of negative polarity as indicated by the dotted-line arrow is taken out in load $A_L$. If the polarity of the output pulse current is expressed by symbol Z, Z is − in the above case.

(2) When X is in the − condition, and Y is in the + condition. That is, when the cores $M_1$, $M_{a2}$, $M_{a3}$, and $M_{a4}$ are written in the conditions of (+), (+), (+), and (+), respectively, the output coils wound on the cores $M_1$, $M_3$, and $M_{a1}$, $M_{a3}$ present high impedance against the current $I_r$, and the output coils wound on the cores $M_2$, $M_4$ and $M_{a2}$, $M_{a4}$ present low impedance against the current $I_r$. Consequently, the current $I_r$ flows principally in the direction of: $+R \rightarrow 1a \rightarrow 2a \rightarrow T_o \rightarrow Z_L \rightarrow T_{ao} \rightarrow 6a \rightarrow 5a \rightarrow Ra$, and an output pulse current of positive polarity as indicated by the full line arrow is obtained at the load $Z_L$.

Accordingly, Z is + in this case.

(3) When X is the + condition, and Y is in the − condition. That is, in this case, the output coils wound on the cores $M_2$, $M_4$ and $M_{a1}$, $M_{a3}$ offer high impedance against the current $I_r$ and the output coils wound on the cores $M_1$, $M_3$, and $M_{a2}$, $M_{a4}$ offer low impedance against the current $I_r$. Consequently, the current $I_r$ flows principally in the direction of $+R \rightarrow 1 \rightarrow 2 \rightarrow Z_L \rightarrow T_{ao} \rightarrow 6 \rightarrow 5 \rightarrow Ra$, and at the load $Z_L$, an output pulse current of positive polarity is obtained, similarly as in the preceding case 2. Accordingly, Z is +.

(4) When X and Y are both in the + condition. In this case, the output coils wound on the cores $M_2$, $M_4$ and $M_{a2}$, $M_{a4}$ offer high impedance against the current $I_r$, and the output coils wound on the cores $M_1$, $M_3$ and $M_{a1}$, $M_{a3}$ offer low impedance against the current $I_r$. Consequently, the current $I_r$ flows principally in the direction of: $+R \rightarrow 1$, $1a \rightarrow 2$, $2a \rightarrow T_o \rightarrow Z_L \rightarrow T_{ao} \rightarrow 6$, $6a \rightarrow 5$, $5a \rightarrow Ra$, and, in this case also, an output pulse current of positive polarity is obtained at the load $Z_L$. Accordingly, Z is +.

Now, if the conditions which have been written in the first and second circuits in the state of X and Y and the polarity of the output pulse current $I_o$ taken out at the load Z by impressing a reading-out pulse current $I_r$ on these conditions, that is Z, are represented for each of the above cases, a pattern as shown in Table 1($a$) results. Further, if the + and − symbols which indicate these polarities are made to correspond to 1 and 0 of binary digits, a pattern as shown in Table 1($b$) results.

| Table 1(a) | | | | Table 1(b) | | | | |
|---|---|---|---|---|---|---|---|---|
| | X | Y | Z | | X | Y | Z | |
| (1) | − | − | − | (1) | 0 | 0 | 0 | − |
| (2) | − | + | + | (2) | 0 | 1 | 1 | + |
| (3) | + | − | + | (3) | 1 | 0 | 1 | + |
| (4) | + | + | + | (4) | 1 | 1 | 1 | + |

These tables, in other words, indicate that the polarity Z of the output pulse current is extracted as the result of carrying out, during the reading out of the written-in conditions of the condition X of the first circuit and the condition Y of the second circuit, the operation of the logical sum $Z=X+Y$ of the said conditions X and Y, with said X and Y as logical variables.

After the information written in the respective magnetic cores has been read out in the above manner, both the first and second circuits assume the condition of (+), (−), (+), and (−), respectively. Then, by causing a reset pulse current $I_s$ to flow in the windings S and $S_a$, said circuits are returned to the original condition of (−), (+), (+), and (−). The possibility of carrying out successive logical operations by the repetition of the same steps as described above is the same as in the case of using the circuit of FIG. 12 in the form shown, and, in general, both are used in suitable combination. Furthermore, the purpose of inserting the rectifying elements $D_1$ through $D_4$ and $D_{a1}$ through $D_{a4}$, which are connected in series in their respective output windings, that is, to suppress the current which flows through the output winding side during writing in and in the case of resetting and, thereby, to enable efficient writing in and resetting is the same as has been described previously. In this case however, either $D_2$ and $D_4$, or $D_{a1}$ and $D_{a4}$, may be omitted without causing detrimental effect on the functions of writing in and resetting. In the general case, the load $Z_L$ is substituted by the input winding of the next stage, and the output pulse current $I_o$ is imposed to the input winding of the next stage as a signal input pulse current, in the same way as was described with reference to FIG. 5. The slight difference in the amplitude of the output pulse current with respect to the four kinds of combinations of X and Y, as indicated in Table 1 ($a$) or ($b$), can be remedied fully by using magnetic cores having an excellent rectangular characteristics and coercive force $H_c$ of low magnitude.

The above description relates to the case wherein logical sum is carried out on the output side Next, another example indicated in FIG. 15, of logical operation on the output side, the case of carrying out logical multiplication or product, will now be described.

Referring to FIG. 15, while the directions of the windings with respect to their respective magnetic cores are exactly the same as in the case of FIG 13, only the connections of the respective terminals of the output windings are different, that is, the connections of the points 1 through 8 and 1*a* through 8*a* and the terminals +R and −R*a* are as follows: 1 to 7 and 7*a*, 2 to 1*a*, 2*a* to 4*a* and 4, 3 to 3*a* and 5, 6 to 5*a*, and 6*a* to 8*a* and 8; the reading-out pulse source terminals +R and −R*a* are connected, respectively, to 1, 7 and 3, 5; and the output terminals $T_o$ and $T_{ao}$ are connected, respectively, to 2*a*, 4*a* and 6*a*, 8*a*. Thus, the steps of operation of this circuit arrangement are exactly the same as those of the case illustrated in FIG. 13 in that for example: a resetting pulse current $I_s$ is made to flow through the reset windings S and $S_a$ of the first circuit I and the second circuit II to reset the respective circuits: a writing-in bias pulse current $I_w$ is made to flow through the writing-in bias windings W and $W_a$, and signal input pulse currents $I_{i1}$, $I_{i2}$, $I_{i3}$, and $I_{ai1}$, $I_{ai2}$, $I_{ai3}$ are made to flow, respectively, through the signal input windings $I_{N1}$, $I_{N2}$, $I_{N3}$, and $I_{aN1}$, $I_{aN2}$, $I_{aN3}$, of the respective circuits to effect logical operation on the input side; writing-in as the result thereof, is carried out in the form of (+) or (−) polarity, in the first circuit and the second circuit; and the reaction current which flows through the output side during resetting and writing-in is completely suppressed by the internal impedance of the reading-out pulse source and the reverse resistance of the rectifying elements Therefore, similarly as in the case illustrated in FIG. 13, the case of reading out will be described below with X representing the written-in condition of the first circuit and Y representing the written-in condition of the second circuit.

FIG. 16 illustrates, similarly as does FIG. 14, the output circuit as being represented by U, U*a*, U, and $\overline{U}a$, corresponding to the functioning of the contact points of mechanical relays.

(1) When both X and Y are in the − condition. In this case, if a reading-out pulse current $I_r$ is made to flow through the terminals +R and −R*a*, the output coils wound on the cores $M_1$, $M_3$, and $M_{a1}$, $M_{a3}$ offer high impedance against said current $I_r$, and the output coils wound on the cores $M_2$, $M_4$ and $M_{a2}$, $M_{a4}$ offer low impedance against the same. Consequently, the current $I_r$ flows principally in the direction of: Reading-out pulse source terminal +R→7, 7*a*→8, 8*a*→$T_{ao}$→$Z_L$→$T_o$→4, 4*a*→3, 3*a*→−R*a*, and an output pulse current $I_o$ of negative polarity is obtained at the load $Z_L$. Accordingly if the polarity of the current $I_o$ is expressed by symbol Z in the same manner as in the case of FIG. 13 Z is −.

(2) When XX is in the −, and Y is in the + condition. In this case, the cores $M_1$, $M_3$ and $M_{a2}$, $M_{a2}$ offer high impedance against the current $I_r$, and the cores $M_2$, $M_4$ and $M_{a1}$, $M_{a3}$, offer low impedance against the current $I_r$. Consequently the current $I_r$ flows principally in the direction of: +R→7→8→$T_{ao}$→$Z_L$→$T_o$→4→3→R*a*, and since an output pulse current of (−) polarity is obtained as before, Z is −.

(3) When X is in the + and Y is in the − condition. In this case, the cores $M_2$, $M_4$ and $M_{a1}$, $M_{a3}$ offer high impedance against the current $I_r$, and cores $M_1$, $M_3$ and $M_{a2}$, $M_{a4}$ offer low impedance against the current $I_r$. Consequently the current $I_r$ flows principally in the direction of: +R→7*a*→8*a*→$T_{ao}$→$Z_L$→$T_o$→4*a*→3*a*→−R*a*, and since an output pulse current of − polarity is obtained as before, Z is −.

(4) When both X and Y are in the − condition. In this case, the cores $M_2$, $M_4$ and $M_{a2}$, $M_{a4}$ offer high impedance against the current $I_r$, and the cores $M_1$, $M_3$ and $M_{a1}$, $M_{a3}$, offer low impedance against the current $I_r$. Consequently the current $I_r$ flows principally in the direction of:

+R→1→2→1*a*→2*a*→−$T_o$→$Z_L$→$T_{ao}$→
6*a*→5*a*→6→5→−R*a* and an output pulse current $I_o$ of + polarity is obtained at the load $Z_L$. Accordingly, Z is +.

Now as all the above cases are represented in the same manner as in the case illustrated in FIG. 13, Table 2(*a*) and Table 2(*b*) result.

| Table 2(a) | | | | Table 2(b) | | | | |
|---|---|---|---|---|---|---|---|---|
| | X | Y | Z | | X | Y | Z | |
| (1) | − | − | − | (1) | 0 | 0 | 0 | − |
| (2) | − | + | − | (2) | 0 | 1 | 0 | − |
| (3) | + | − | − | (3) | 1 | 0 | 0 | − |
| (4) | + | + | + | (4) | 1 | 1 | 1 | + |

These tables indicate that the output pulse current $I_r$ is taken out as the result of carrying out, during the reading out of the written-in conditions of the first circuit side, that is, X, and of the second circuit, that is Y, the operation of the logical product $Z=X\cdot Y$ of the said conditions X and Y, with said X and Y as logical variables.

In this case also, the fact that either the cores $D_1$ and $D_3$, or $D_{a1}$, and $D_{a3}$, may be omitted without causing detrimental effect on the functions of writing-in and resetting, and the fact that the same is true even with the use of a basic circuit other than that of FIG. 5, that is, the circuit of FIG. 8 or FIG. 9, etc., is the same as in the case relating to FIG. 13. Moreover, in the case wherein operation is to be carried out on the output side in a circuit using two magnetic cores of and two rectifying elements as in case of FIG. 1, it is possible to carry out operation on the output side in exactly the same manner as described before, by using, as the first and second circuits, two of each; connecting in series, input windings in each of the first and second circuits; dividing and separating the output winding side into unit elements similarly as in the aforedescribed case; and connecting the same in the forms as indicated in FIGS. 13 and 15. In other words, the number of output windings including the unit elements, that is, the rectifying elements, is the same in either case.

Of course, the output pulse current resulting from operation carried out on the output side may be used also as the input pulse current of the circuit using two magnetic cores and rectifying elements.

The cases wherein operations of logical sum and logical product are effected on the output side during reading out have been described above.

It will be appreciated that both the AND and OR circuits have two units of the four magnetic element logic units. That the output couplings and diodes of the corresponding magnetic elements of the units are connected alternately in series and in parallel. That is if the output couplings of the first elements are in parallel, the output couplings of the second units are in series, the third are in parallel, the fourth in series. If the first elements are in series the sequence is reversed. These connections form sequential pairs of output couplings. The first pair formed from the first elements, the second pair from the second elements, etc. Then two pairs are connected to the plus read-out terminal and the two remaining pairs to the minus read-out terminals. Then two pairs are picked without consideration of the pairs connected to the read-out terminal, these new pairs are connected to the plus and minus output terminals respectively.

A further example is described below:

FIG. 17 illustrates an example of operation on the output side, which, with the use of four sets of the basic logical circuit of FIG. 12, carries out the action of "Full Adder" in one operation during the reading out of the information content which has been written in the form of the polarities of the magnetic cores of the respective circuits. That is, let the input windings of the circuit be designated, respectively, by $I_{NX}$, $I_{NY}$, and $I_{NZ}$; let the signal input currents which are imposed simultaneously on said windings in the four circuits be designated by *x*, *y* and *z*; and let it be supposed that said currents are imposed with +, − polarities and equal amplitudes in the direction of from + to − to said input windings. Similarly as in the cases of FIGS. 13 and 15, a current $I_w$ is caused to be imposed to the writing-in bias windings W, and a current is caused to be imposed to the reset windings S, these currents being made to take place simultaneously in the four circuits. On the output side, let the output terminals be, respectively, $T_{o1}$, $T_{ao1}$, $T_{o2}$, $T_{ao2}$, $T_{o3}$, $T_{ao3}$, $T_{o4}$, $T_{ao4}$, let their connections be $T_{o1}$ to $T_{o2}$, $T_{ao1}$ to $T_{ao2}$, $T_{o3}$ to $T_{ao4}$ and $T_{ao3}$ to $T_{ao4}$; in addition let $T_{o1}$ be connected to $T_{o3}$ and $T_{ao1}$ to $T_{ao3}$; and let a load $Z_L$ be connected between $T_{o3}$ and $T_{ao1}$. Let the polarity of the output pulse current $I_o$ flowing through the load $Z_L$ be designated by $-w$, and let the current $I_o$ which flows in the direction of from $T_{o1}$ to $T_{ao1}$ be of positive polarity and from $T_{ao1}$ to $T_{o1}$ be of negative polarity. Further, as the reading-out pulse currents, let the current $I_r$ be made to flow, with respect to the circuits $E_1$, $E_2$, from the terminal $+R_2$ of the circuit $E_2$ to the terminal $-R_{a1}$ of the circuit $E_1$; and let the current $I_{ar}$ be made to flow, with respect to circuits $E_3$, $E_4$, from the terminal $+R_4$ of the circuit $E_4$ to the terminal $-R_{a3}$ of the circuit $E_3$; whereby both amplitudes of $I_r$ and $I_{ar}$ are caused to be equal. Let it be supposed that current is prevented from flowing from $R_2$ to $R_{a3}$ or $R_4$ to $R_{a1}$, that is, two reading-out pulse sources having terminals $R_2$, $R_{a1}$ and $R_4$ and $R_{a3}$ are different. The output circuits of FIG. 17 are represented in FIG. 18 by $U_1$, $U_2$, $U_3$, $U_4$ and $\overline{U}_1$, $\overline{U}_2$, $\overline{U}_3$, $\overline{U}_4$; let it be supposed that these, in this case also, have, respectively, the same functioning capacities as U, $\overline{U}$ described previously. In FIG. 18, A, B, C, and D, and A*a*, B*a*, C*a*, and D*a* are, respectively, four arms of one of two bridges the output terminals of which are made common.

Now, the symbol which assumes when signal input currents *x*, *y*, *z* are imposed in various combinations of + or − will be studied.

(1) When *x*, *y*, *z* are all +. Since in the circuit $E_1$, all of the signal input windings are "Not," and the signal input currents *x*, *y*, and *z* are all +, the signals will be written in the (−) condition. Since in the circuit $E_2$, the signal input windings $I_{NX}$ and $I_{NZ}$ are positive, and only $I_{NY}$ is "Not," the signals will be written in the (+) condition. Since in the circuit $E_4$, $I_{NX}$ is "Not," and the currents $I_{NY}$ and $I_{NZ}$ are positive, the signals will be written in the (+) condition. If, with the circuits written in such conditions as above-described, reading out pulse currents $I_r$ and $I_{ar}$, of equal amplitude, are made to flow simultaneously through the terminals $R_2$, $R_{a1}$ and $R_4$, $R_{a3}$ of the reading-out pulse sources, coils wound on the cores $M_{24}$, $M_{11}$ will offer high impedance, and the coils wound on the cores $M_{23}$, $M_{12}$ will offer low impedance within the output windings against the current $I_r$. Consequently, the greater part of the current $I_r$ will flow in the direction of $R_2 \to T_{o2} \to T_{o1} \to R_{a1}$, and almost none will flow in the load $Z_L$. On the other hand, the coils wound on the cores $M_{44}$, $M_{32}$ will offer high impedance, and the coils wound on the cores $M_{43}$, $M_{31}$ will offer low impedance against the current $I_{ar}$. Consequently, the greater part of the $I_{ar}$ will flow in the direction of $R_4 \to T_{o4} \to T_{o3}$, $T_{o1} \to Z_L \to T_{ao3} \to R_{a3}$, and an output pulse current will flow in the load $Z_L$ in the direction from + to −. Accordingly, *w*, which indicated the polarity of the current $I_o$ is +.

(2) When *x* and *y* are +, and *z* is −. In this case, the circuits $E_1$, $E_2$, $E_3$, and $E_4$ are written in, respectively, as (−), (−), (+), and (−). If, with the said circuits in the said conditions, reading-out pulse currents $I_r$ and $I_{ar}$, are made to flow, respectively, through the reading-out terminals $R_2$, $R_{a1}$ and $R_4$, $R_{a3}$, the coil wound on the cores $M_{23}$, $M_{11}$ will offer high impedance, and the coils wound on the cores $M_{24}$, $M_{12}$ will offer low impedance, in the respective output windings against the current $I_r$. Consequently the greater part of the current $I_r$ will flow in the direction of $R_2 \to T_{ao2} \to T_{ao1} \to Z_L \to T_{o1} \to R_{a1}$. On the other hand, the coils wound on the cores $M_{43}$, $M_{32}$ will offer high impedance, and the coils wound on the cores $M_{44}$, $M_{31}$ will offer low impedance against the current $I_{ar}$. Consequently, the greater part of the current $I_{ar}$ will flow in the direction of $R_r \to T_{ao4} \to T_{ao3} \to R_{a3}$, and hardly any will flow through the load $Z_L$. As a result, the output pulse current $I_o$, which is the greater part of the current $I_r$, will flow in the negative direction through the load $Z_L$. Accordingly, *w* will become −.

(3) When *x* is +, and *y* and *z* are −. In this case, the circuits $E_1$, $E_2$, and $E_3$ are written in the condition of (+) and the circuit $E_4$ in the condition of (−). As a result, the coils wound on the cores $M_{24}$, $M_{12}$ will offer high impedance, and the coils wound on the cores $M_{23}$, $M_{11}$ will offer low impedance, within the output windings of the respective circuits against the current $I_r$. Consequently, the greater part of the current $I_r$ will flow in the direction of $R_2 \to T_{o2} \to T_{o1} \to Z_1 \to T_{ao1} \to R_{a1}$. On the other hand, the coils wound on the cores $M_{43}$, $M_{32}$ will offer high impedance, and the coils wound on the cores $M_{44}$, $M_{31}$ will offer low impedance, against the current $I_{ar}$. Consequently, the greater part of the current $I_{ar}$ will flow in the direction of $R_4 \to T_{ao4} \to T_{ao3} \to R_{a3}$, and hardly any will flow through the load $Z_L$. As a result, the output pulse current $I_o$ due to the greater part of the current $I_r$ will flow through the load $Z_L$ in the positive direction. Accordingly, *w* will be +.

(4) When *x*, *y*, *z* are all −. In this case, the circuit $E_1$ is written in as (+), and the other circuits $E_2$, $E_3$, $E_4$ are written in as (−). As a result, the coils wound on the cores $M_{23}$, $M_{12}$ will offer high impedance, and the coils wound on the cores $M_{24}$, $M_{11}$ will offer low impedance, within the output windings of the respective circuits, against the current $I_r$. Consequently, the greater part of the current $I_r$ will flow in the direction of $R_2 \to T_{ao2} \to R_{a1}$, and almost none will flow through the impedance $Z_L$. On the other hand, the coils wound on the cores $M_{43}$, $M_{31}$ will offer high impedance, and the coils wound on the cores $M_{44}$, $M_{32}$ will offer low impedance against the current $I_{ar}$. Consequently, the greater part of the current $I_{ar}$ will flow in the direction of $R_4 \to T_{ao4} \to T_{ao3} \to Z_1 \to T_{ao3} \to R_{a3}$. As a result, the output pulse current $I_o$, which is the greater part of the current $I_{ar}$, will flow through the load $Z_L$ in the negative direction. Accordingly, *w* is −.

If, now, the relations between the symbols of the input currents, the polarities of the circuits $E_1$, $E_2$, $E_3$ and $E_4$, and the symbol of *w* of the output current are tabulated, Table 3(*a*) will be produced. Further, if the + and − symbols of the input and output currents are made to correspond to 1 and 0 of binary digit, Table 3(*b*) will be produced.

Table 3(b)

| | Input | | | Circuit | | | | Output |
|---|---|---|---|---|---|---|---|---|
| | X | Y | Z | 1 | 2 | 3 | 4 | W |
| (1) | + | + | + | (−) | (+) | (+) | (+) | + |
| (2) | + | + | − | (−) | (−) | (+) | (−) | − |
| (3) | + | − | − | (+) | (+) | (+) | (−) | + |
| (4) | − | − | − | (+) | (−) | (−) | (−) | − |

Table 3(b)

| x | y | z | w |
|---|---|---|---|
| 1 | 1 | 1 | 1 |
| 1 | 1 | 0 | 0 |
| 1 | 0 | 0 | 1 |
| 0 | 0 | 0 | 0 |

With respect to combinations other than those of *x*, *y*, and *z* indicated in Table 3(*b*) may be tried in the above described manner. Table 3(*b*) indicates that the circuit of FIG. 17 possesses the function of a "Full Adder."

While in the case of FIG. 17, the case is illustrated wherein the circuit elements with four magnetic cores and diodes are used, it is apparent from FIG. 17 or FIG. 18 that, since only a half of the circuit elements is sufficient, it is possible to divide and separate the output sides of unit logical circuits which are provided with the two magnetic cores and diodes indicated in FIG. 1, to reconnect the same suitable, and to construct "Full Adder" similar to that of FIG. 17. Furthermore, in the embodying of this invention, when a pulse output current caused by a logical operation at the output side is used as the pulse input current of the next state, "Not" operation can be, as described above, easily attained by reverse connection of the output terminals of the next stage.

The logical operation of "And," "Or," and "Full Adder" at the output side have been described hereinbefore. However, any person having an ability capable of constructing a relay circuit by use of mechanical relays can easily construct the following various complex logical circuits by application of the logical circuit of this invention.

For example, the logical function such as shown by the equation $$(X_1+X_2)\cdot X_4=Z$$

can be easily embodied by the circuit as shown in FIG. 19. In the circuit of FIG. 19 input, writing-in bias, and resetting windings are omitted; the circuit I, comprises output windings $L_{11}$, $L_{12}$, $L_{13}$, and $L_{14}$, and rectifying elements $D_{11}$, $D_{12}$, $D_{13}$ and $D_{14}$ and is written in with the input signal corresponding to $X_1$; the circuit II comprises output windings $L_{21}$, $L_{22}$, $L_{23}$, and $L_{24}$ and rectifying element $D_{21}$, and $D_{22}$ and is written in with the input signal corresponding to $X_2$; the circuit III comprises output windings $L_{31}$, $L_{32}$, $L_{33}$, and $L_{34}$ and rectifying elements $D_{31}$ and $D_{32}$ and is written in with the input signal corresponding to $X_3$; and the circuit IV comprises output windings $L_{41}$, $L_{42}$, $L_{43}$, and $L_{44}$ and rectifying elements $D_{41}$ and $D_{42}$ and is written in with the input signal corresponding to $X_4$.

FIG. 20 represents the equivalent circuit diagram in which contact points $U_{11}$, $\overline{U}_{12}$, $\overline{U}_{13}$, $\overline{U}_{14}$, $U_{21}$, $\overline{U}_{22}$, $U_{23}$, $\overline{U}_{24}$, $U_{31}$, $\overline{U}_{32}$, $U_{33}$, $\overline{U}_{34}$, $U_{41}$, $\overline{U}_{42}$, $U_{43}$, $\overline{U}_{44}$, of mechanical relays have been substituted for the outpost windings $L_{11} \ldots L_{14}$, $L_{21} \ldots L_{24}$, $L_{31} \ldots L_{34}$, $L_{41} \ldots L_{44}$.

FIG. 21 shows a modification of the relay circuit of FIG. 20, the operation of the circuit of FIG. 21 being entirely the same as that of the circuit of FIG. 20.

The rectifying elements used in the circuit of FIG. 21 act to give directivity to the pulse currents.

FIG. 22 shows an actual logical circuit for carrying out the logical function.

$$X_1+X_2+X_3X_4=Z$$

FIG. 23 shows the equivalent diagram of the circuit of FIG. 22, in which the contact points of mechanical relays have been substituted for the output windings.

FIG. 24 shows a modification of the relay circuit of FIG. 23.

In FIGS. 22, 23, and 24, the same members are, respectively, designated by the same symbols as those in FIGS. 19, 20, and 21.

Furthermore, $$G=g_0 2^0+g_1 2^1+g_2 2^2+ \ldots +g_n 2^n$$
$$H=h_0 2^0+h_1 2^1+h_2 2^2+ \ldots +h_n 2^n$$

Here, $g_i$ $h_i$ may be taken to be a binary digit representing 0 or 1.

The sum D or G and H may be expressed as $$D=d_0 2^0+d_1 2^1+d_2 2^2+ \ldots +d_n 2^n+d_n+1 2^{n+1}$$

and the adder determining $d_i$ from $g_i$ and $H_i$ can determine $d_i$ from the following Equation 1 by use of the following relations 2:

$$d_i=C_i G_i h_i+C_i \overline{g}_i \overline{h}_i+\overline{C}_i g_i \overline{h}_i+C_i g_i h_i \quad (1)$$

$$\left.\begin{array}{l} C_o=g_o h_o \\ C_1=g_i h_1+g_i C_o+h_i C_{oi} \\ \text{-------------------} \\ C_i=g_i h_i+g_i C_i-1+h_i C_i-1 \\ \text{-------------------} \\ C_n=g_n h_n+g_n C_n-1+h_n C_n-1 \end{array}\right\} \quad (2)$$

Here, $C_n$ is unknown until $C_o$, $C_1$, . . . $C_n-1$ have been determined in order. Consequently, in the case of an adder which carries out such additions in parallel at high speed, a high-speed, carry detector which quickly determines $C_o$, $C_1$, . . . $C_{n-}$ becomes necessary. However, the logical circuit for this purpose ordinarily requires an extremely large number of elements and, moreover, requires a considerable long period of time. Yet, it is known that, in the relay circuits, a carry detector capable of instantaneously detecting carry by the circuit illustrated in FIG. 24, wherein $C_o$, $\overline{C}_o$; . . . ; $C_i$, $\overline{C}_i$ . . . ; $C_n$, $\overline{C}_n$ can be determined from the fact that they are obtained as electric currents representing their respective logical functions at the portions indicated by the arrows in the illustrations. Furthermore, the circuits which can be constructed by such a combination of relays as described above can all be composed from the logical circuit of this invention as previously described.

Accordingly, by composing the same circuit as in FIG. 25 by the use of the logical circuit of this invention and, as indicated therein, by connecting the lines of $C_i$ and $\overline{C}_i$ to the input winding of the circuit of the next stage, $C_o$, $C_i$, $C_2$, . . . , $C_n$ can be obtained immediately. By the present invention, a high speed carry detector of $n$ digits can be composed from only $3n$ logical elements. Said number cannot be realized, by any means, with other kinds of logical circuits. Moreover, this circuit is series-connected in ladder formation, and $C_o$ . . . $C_n$ can be obtained from many points of the ladder.

Therefore, by combining said carry detector and the "Full adder" described with reference to FIG. 17, it is possible to carry out extremely high-speed additions of $n$ digits.

The fact that, by the use of the logical circuit of this invention as described above, various kinds of complicated logical operations are realized at extremely high speed and, moreover, with a small number of elements, is of exceedingly great interest.

As has been described above in detail, the logical operation circuit of this invention is one in which, an even number of magnetic cores having rectangular hysteresis characteristics is taken as one group; the magnetic cores are provided with windings and combined with rectifying elements; a reading-out pulse current is made to flow directly in the output windings and the input winding of the next state, without the use of such means as a transformer for the input or output; and the writing in and reading out of information signals are made to take place by utilizing the directional changes of the residual magnetic fluxes of the magnetic cores. Therefore, it is possible to make the output pulse flow always with constant amplitude without floating of its basic level. Furthermore, the output circuit is in the form of a bridge; the load impedance, as viewed from the power resource for reading-out, does not change in accordance with the writing-in condition; a reading-out pulse current of constant amplitude can be always supplied to the circuit; and it is possible to effect sure and accurate logical operations. Moreover, since the logical operation circuit of this invention is composed of a combination of only magnetic cores and rectifying elements, it is possible to raise the operation speed up to the limit set by the overheating of the magnetic cores and the current capacities of the rectifying elements. Since the output circuit is in the form of a bridge, and the ouput power is determined by the difference or ratio of the impedance of the output windings, the effect of the magnetic cores on overheating is small.

Moreover, by the operation of the logical circuit of this invention, since said operation is made to take place in conformity with the principle of decision by majority of the input signals, and, at the same time, the output windings on the magnetic cores are divided and separated into minor elements with rectifying elements connected in series; the logical operation of the information signal which has been written in two or more groups of magnetic core sets is effected by combining and connecting, according to the object, two or more minor elements; and it is possible to obtain the result of said operation in the form of output pulse current, and two cycles of logical operations are carried out with one control cycle of writing-in and reading-out. Thus, by the circuit of this invention, it is possible to increase the operational speed, practically, by two or more times as compared with those of the conventional circuits of this type. Accordingly, the industrial value of the logical circuit of this invention is extremely high.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

What we claim is:

1. A logic circuit comprising a plurality of logic units each unit comprising four magnetic elements each having substantially rectangular hystersis characteristics, each of the elements having three kinds of couplings namely, an equal odd number of input couplings, a write-in coupling, and an output coupling; the write-in and output couplings being connected in series respectively to form write-in and output ports, means connecting one input coupling from each element in series with one another to form a plurality of respective input ports the same in number as there are input couplings on an element; all the couplings of one element being coupled to magnetize in the same direction, one of the three kinds of couplings on each of the remaining elements being reversely coupled with respect to the other two kinds of couplings on the same element and each of the three kinds of ports including one of said reversely coupled couplings, means for applying a resetting pulse current having amplitude sufficient to saturate the elements to a reset port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; the output port connected in a closed loop to form a bridge each output coupling being an arm of the bridge, with junctions between the arms, two opposed junctions of the bridge being plus and minus output terminals respectively, the remaining two junctions being plus and minus readout terminals respectively; four rectifying elements connected in series with the output couplings respectively the forward direction of the rectifying elements being from plus to minus of the readout terminals; means for applying a readout pulse current to the readout terminals causing an output signal to exist at the output terminals and thus retrieving the information stored into the unit by the input current; means connecting the output port of all but one unit to the input port of another unit in cascade fashion whereby a shift register is formed.

2. A logic circuit as in claim 1 wherein the plurality of logic units are classified into N classes in cyclic manner with respect to the cascade connection, adjacent units not being members of the same class, the units within each class having input and write-in ports connected in parallel, the input and write-in currents being $1/N$ cycles apart in phase between adjacent classes whereby the speed of operation is increased.

3. A logic circuit as in claim 2 wherein N equals two.

4. A logic circuit comprising an even number of connected coacting like logic units each unit comprising four magnetic elements each having substantially rectangular hysteresis characteristics, each of the elements having three kinds of couplings namely, an equal odd number of input couplings, a write-in coupling, and an output coupling; the write-in and output couplings being connected in series respectively to form write-in and output ports, means connecting one input coupling from each element in series with one another to form a plurality of respective input ports the same in number as there are input couplings on an element; all the couplings of one element being coupled to magnetize in the same direction, one of the three kinds of couplings on each of the remaining elements being reversely coupled with respect to the other two kinds of couplings on the same element and each of the three kinds of ports including one of said reversely coupled couplings, all the input couplings on each element being coupled in the same direction; means for applying a resetting pulse current having amplitude sufficient to saturate the elements to a reset port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; the output port connected in a closed loop to form a bridge each output coupling being an arm of the bridge, with junctions between the arms, two opposed junctions of the bridge being plus and minus output terminals respectively, the remaining two junctions being plus and minus readout terminals respectively; four rectifying elements connected in series with the output couplings respectively the forward direction of the rectifying element being from plus to minus of the readout terminals; means for applying a readout pulse current to the readout terminals causing an output signal to exist at the output terminals and thus retrieving the informaion stored into the unit by the input current; circuit means connecting the output and readout ports respectively, the input pulses of respective units being independent whereby logic operations are performed at the output terminals.

5. A logic circuit as in claim 4 having four units wherein the circuit means comprises means connecting all the plus and minus output terminals in parallel respectively; means connecting the plus readout terminals for two of the units; means connecting the minus readout terminals from the two remaining units whereby a full adder is formed.

6. A logic circuit comprising two logic units each unit comprising sequentially first, second, third and fourth magnetic elements each having substantially rectangular hysteresis characteristics, each of the elements having three kinds of couplings namely, an equal odd number of input couplings, a write-in coupling, and an output coupling having first and second ends; the write-in couplings being connected in series to form a write-in port; means connecting one input coupling from each element in series with one another to form a plurality of respective input ports the same in number as there are input couplings on an element; all the couplings of one element being coupled in the same direction, one of the three kinds of couplings on each of the remaining elements being reversely coupled with respect to the other two kinds of couplings on the same element, and each of the three kinds of ports including one of said reversely coupled couplings; means for applying a resetting pulse current having amplitude sufficient to saturate the elements to a reset port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; four electronic rectifiers placed in series with first end of each output coupling respectively; output couplings of the first and second elements being connected to the cathode of the rectifier, output couplings of the third and fourth elements being connected to the anode of the rectifiers; plus and minus output terminals, plus and minus read-out terminals; means connecting with respect to the first elements, both anodes of the rectifiers to the plus read-out terminals, both second ends of the output couplings to the plus output terminal; means connecting with respect to the second elements, an anode of the rectifier of one element to the second end of the output coupling of the other element, the remaining anode to the plus read-out terminal, the remaining second end to the minus output terminal; means connecting with respect to the third elements, both cathodes to the minus read-out terminals, both second ends to the minus output terminal; means connecting with respect to the fourth elements, a cathode of one rectifier to the second end of the output coupling of the other element, the remaining cathode to the minus read-out terminal, the remaining second end to the plus output terminal; whereby an OR circuit is formed.

7. A logic circuit comprising two logic units, each unit comprising sequentially first, second, third and fourth magnetic elements each having substantially rectangular hysteresis characteristics, each of the elements having three kinds of couplings namely, an equal odd number of input couplings, a write-in coupling, and an output coupling having first and second ends; the write-in couplings being connected in series to form a write-in port; means connecting one input coupling from each element in series with one another to form a plurality of respective input ports the same in number as there are input couplings on an element; all the couplings of one element being coupled in the same direction, one of the three kinds of couplings on each of the remaining elements being reversely coupled with respect to the other two kinds of couplings on the same element, and each of the three kinds of ports including one of said reversely coupled couplings, means for applying a resetting pulse current having amplitude sufficient to saturate the elements to a reset port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; four electronic rectifiers placed in series with first end of each output coupling respectively; output couplings of the first and second elements being connected to the cathode of the rectifier, output couplings of the third and fourth elements being connected to the anode of the rectifiers, plus and minus output terminals; plus and minus read-out terminals; means connecting with respect to the first elements, an anode of the rectifier of one output coupling to the second end of the output coupling of the other element, the remaining anode to the plus read-out terminal, the remaining second end to the plus output terminal; means connecting with respect to the second element, both anodes of the rectifier to the plus output terminal both second ends of the output couplings to the minus read-out terminal; means connecting with respect to the third elements, a cathode of the rectifier of one output coupling to the second end of the output coupling of the other element, the remaining cathode to the minus read-out terminal, the remaining second end to the minus output terminal; means connecting with respect to the fourth elements, both cathodes of the rectifiers to the minus output terminal, both second ends of the output couplings to the plus readout terminal whereby an AND circuit is formed.

8. A logic circuit comprising a plurality logic units, each unit comprising sequentially first, second, third and fourth magnetic elements each having substantially rectangular hysteresis characteristics, each of the elements having three kinds of couplings namely, an equal odd number of input couplings, a write-in coupling, and an output coupling having first and second ends; the write-in couplings being connected in series to form a write-in port, means connecting one input coupling from each element in series with one another to form a plurality of respective input ports the same in number as there are input couplings on an element, all the couplings of one element being coupled in the same direction, one of the three kinds of couplings on each of the remaining elements being reversely coupled with respect to the other two kinds of couplings on the same element, and each of the three kinds of ports including one of said reversely coupled couplings, means for applying a resetting pulse current having amplitude sufficient to saturate the elements to a write-in port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; four electronic rectifiers placed in series with first end of each output coupling respectively; output couplings of the first and second elements being connected to the cathode of the rectifier, output couplings of the third and fourth elements being connected to the anode of the rectifiers; means for interconnecting the units whereby logic operations are performed.

9. A logic circuit in accordance with claim 8, wherein the logic operation is an OR function.

10. A logic circuit in accordance with claim 8, wherein the logic operation is an AND function.

11. A logic circuit in accordance with claim 8, wherein the logic operation is a full adder.

12. A logic circuit in accordance with claim 8, wherein the logic operation is a shift register.

13. A logic circuit comprising two logic units, each unit comprising sequentially first, second, third and fourth magnetic elements each having substantially rectangular hysteresis characteristics, each of the elements having three kinds of couplings namely, an equal odd number of input couplings, a write-in coupling, and an output coupling having first and second ends; the write-in couplings being connected in series to form a write-in port; means connecting one input coupling from each element in series with one another to form a plurality of respective input ports the same in number as there are input couplings on an element, all the couplings of one element being coupled in the same direction, one of the three kinds of couplings on each of the remaining elements being reversely coupled with respect to the other two kinds of couplings on the same element, and each of the three kinds of ports including one of said reversely coupled couplings, means for applying a resetting pulse current having amplitude sufficient to saturate the elements to a reset port to set the unit to initial states of magnetization, the reset port comprising four couplings coupled respectively to the four elements and connected in series, means for thereafter applying a write-in pulse current to the write-in port having amplitude equal to the coercive force of the elements, the write-in coupling and the reset coupling on each of the elements magnetizing each element in opposite polarities, means for applying input pulse currents to at least one of the input ports simultaneously with the application of the write-in pulse; four electronic rectifiers placed in series with first end of each output coupling respectively; output couplings of the first and second elements being connected to the cathode of the rectifier, output couplings of the third and fourth elements being connected to the anode of the rectifiers; means for connecting alternately in series and in parallel with respect to the sequential magnetic elements, the second ends of the output couplings and the remaining unconnected ends of the rectifiers of one logic unit, with the output couplings and the remaining unconnected ends of the rectifiers of the corresponding elements of the second logic unit to form sequential pairs of output couplings; plus and minus read-out terminals, plus and minus output terminals; means for connecting two pairs of output couplings with the plus and minus read-out terminals respectively, with the forward direction of the rectifiers from plus to minus read-out terminals; means for connecting the two remaining pairs of output couplings with the plus and minus output terminals respectively.

14. A logic circuit as in claim 13, wherein the output couplings of the first sequential magnetic elements are connected in parallel; the output couplings of the first two sequential elements are connected to the plus read-out terminal; the output couplings of the second and third sequential elements are connected to the minus output terminal whereby an OR circuit is formed.

15. A logic circuit as in claim 13, wherein the output couplings of the first sequential magnetic elements are connected in series; the output couplings of the second and third sequential elements are connected to the minus read-out terminal; the output couplings of the first and second sequential elements are connected to the plus output terminal; whereby an AND circuit is formed.

References Cited by the Examiner

UNITED STATES PATENTS

| | | | |
|---|---|---|---|
| 2,884,621 | 4/1959 | Ross | 340—174 |
| 2,919,354 | 12/1959 | Russell | 307—88 |
| 2,958,076 | 10/1960 | Kelner | 340—174 |
| 3,030,519 | 4/1962 | Crane | 307—88 |
| 3,030,520 | 4/1962 | Crane | 307—88 |
| 3,098,157 | 7/1963 | Enomoto | 307—88 |
| 3,218,464 | 11/1965 | Goatcher | 307—88 |

BERNARD KONICK, *Primary Examiner.*

M. S. GITTES, *Assistant Examiner.*